(12) United States Patent
Dhanoa

(10) Patent No.: US 7,159,084 B1
(45) Date of Patent: Jan. 2, 2007

(54) MEMORY CONTROLLER

(75) Inventor: Kulwinder Dhanoa, London (GB)

(73) Assignee: Altera Corporation, San Jose, CA (US)

( * ) Notice: Subject to any disclaimer, the term of this patent is extended or adjusted under 35 U.S.C. 154(b) by 234 days.

(21) Appl. No.: 10/751,170

(22) Filed: Dec. 30, 2003

(51) Int. Cl.
G06F 12/06 (2006.01)
(52) U.S. Cl. .................. 711/158; 711/218
(58) Field of Classification Search ......... 711/154, 711/158, 218
See application file for complete search history.

(56) References Cited

U.S. PATENT DOCUMENTS

| | | | | |
|---|---|---|---|---|
| 4,366,539 A | * | 12/1982 | Johnson et al. | 711/218 |
| 5,630,096 A | * | 5/1997 | Zuravleff et al. | 711/154 |
| 5,822,772 A | * | 10/1998 | Chan et al. | 711/158 |
| 6,496,890 B1 | * | 12/2002 | Azevedo et al. | 710/110 |
| 6,519,666 B1 | * | 2/2003 | Azevedo et al. | 710/120 |
| 6,678,803 B1 | * | 1/2004 | LaBerge | 711/154 |
| 6,839,797 B1 | * | 1/2005 | Calle et al. | 711/5 |
| 6,892,199 B1 | * | 5/2005 | Hong et al. | 707/7 |
| 2003/0159008 A1 | * | 8/2003 | Sprangle et al. | 711/154 |
| 2004/0085978 A1 | * | 5/2004 | Bly et al. | 370/412 |

OTHER PUBLICATIONS

ARM, "ARM PrimeCell™ MultiPort Memory Controller (PL176) revision r0p1, Technical Reference Manual" Jun. 2003, ARM, pp. Chapter 1-2.*
ARM, "ARM PrimeCell™ SDRAM Controller (PL170) Technical Reference Manual", Jun. 2001, ARM.*
Aurora VLSI Inc. "AMBA Bus Master Specification" Mar. 2002, Aurora VLSI Inc.*

* cited by examiner

*Primary Examiner*—Pierre Bataille
*Assistant Examiner*—Paul Schlie
(74) *Attorney, Agent, or Firm*—Townsend and Townsend and Crew LLP

(57) ABSTRACT

A memory controller, such as a SDRAM controller, forms a queue of memory access requests to maximize efficient use of the bandwidth of the memory data bus. More specifically, the SDRAM controller pre-calculates the number of data bursts required to retrieve all the required data from the SDRAM, and the starting address for each of the data bursts, and queues the access requests for these data bursts such that the data bursts may be retrieved without incurring the usual read latency for each data burst.

18 Claims, 2 Drawing Sheets

MEMORY CONTROLLER

TECHNICAL FIELD OF THE INVENTION

This invention relates to a memory controller, and in particular to a controller for a SDRAM (Synchronous Dynamic Random Access Memory) device, although the invention is also applicable to other types of memory, and to a method of operation of a memory controller.

BACKGROUND OF THE INVENTION

Computer systems must be provided with sufficient data storage capacity to operate correctly. This data storage capacity is typically provided as Random Access Memory (RAM), and SDRAM is a common form of RAM.

However, the rate at which data can in practice be transferred from a SDRAM remains lower than the rate at which data can in theory be transferred. That is, each access request sent to a SDRAM memory chip, relating to a read operation, incurs a read latency.

When a master device makes multiple read access requests, this read latency can be incurred for each access request.

Accesses to the SDRAM chip are performed by a SDRAM controller, which typically takes the form of an integrated circuit which is separate from the SDRAM. The SDRAM controller is connected to the SDRAM by means of a memory data bus, and the SDRAM controller must operate as far as possible to maximize efficient use of the bandwidth of that bus.

SUMMARY OF THE INVENTION

It is an object of the present invention to minimise the time required to return all of the data read from the memory to the requesting master, while also ensuring efficient use of the bandwidth of the memory data bus.

More specifically, according to a first aspect of the present invention, a SDRAM controller determines for each received access request whether the required data can be retrieved in a single burst, or whether multiple bursts are required.

The SDRAM controller forms a queue of bus access requests, and, if multiple bursts are required for a single read access request, the bus access requests relating to the multiple bursts are queued effectively simultaneously, or at least on successive clock cycles.

This has the advantage that the overall performance of the computer system is optimized since a higher bandwidth can be achieved on the memory data bus, thereby allowing the memory to be used more efficiently.

DETAILED DESCRIPTION OF PREFERRED EMBODIMENTS

Figure 1:
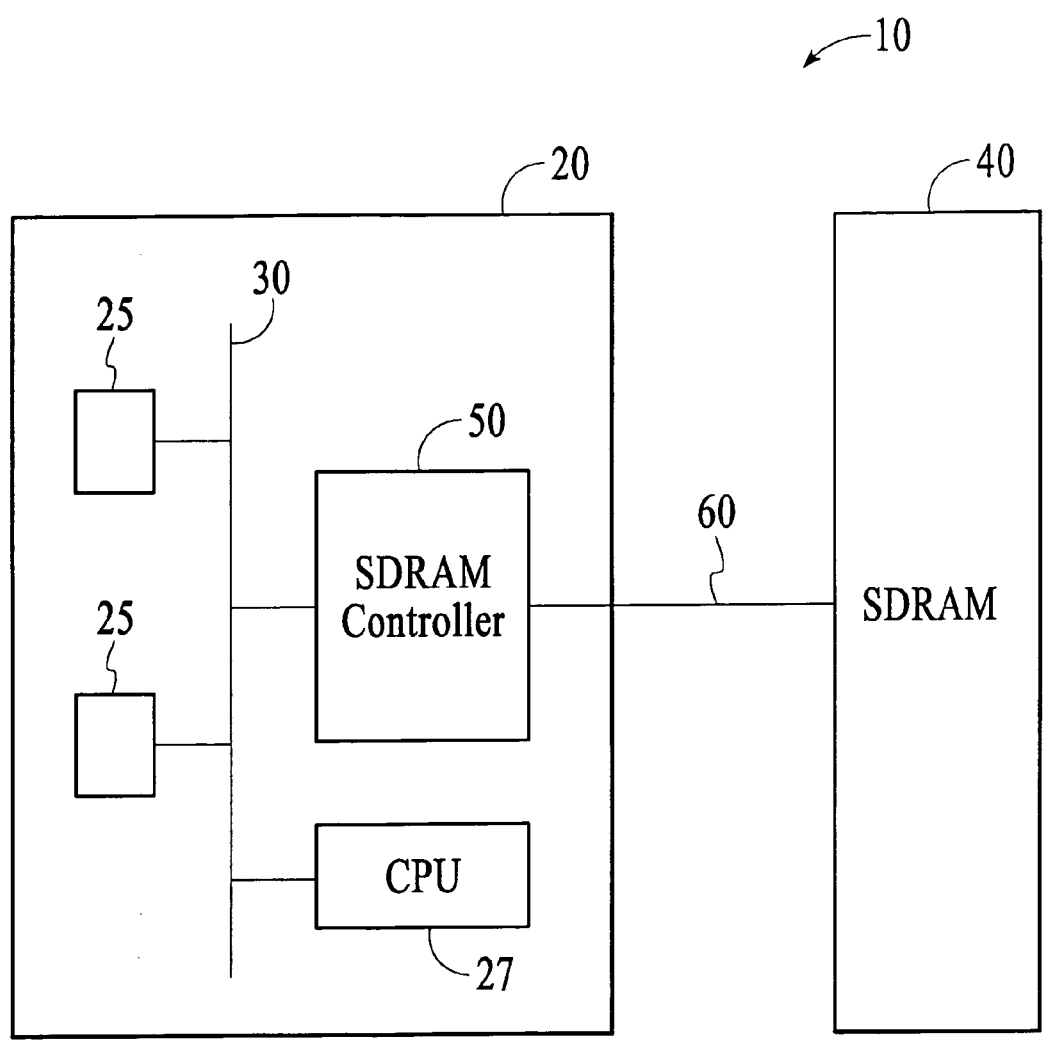
FIG. 1 is a block schematic diagram of a computer system in accordance with the present invention.

FIG. 1 is a block schematic diagram of a computer system 10. The general form of the system 10 is conventional, and will be described herein only to the extent necessary for a complete understanding of the present invention.

In the illustrated embodiment, the system 10 includes an application-specific integrated circuit (ASIC) 20, which includes various modules 25, such as a processor core (CPU) 27. These modules are interconnected by a bus 30, which may advantageously be an AHB bus, but which can be any convenient form of bus.

However, the invention is not limited to such a structure. The invention is also applicable to a device such as a programmable logic device (PLD) or field programmable gate array (FPGA), which can then be configured to contain multiple modules which act as bus masters. The device may then, but need not, contain an embedded processor.

Connected to the ASIC 20 is a memory chip 40, in the form of a Synchronous Dynamic Random Access Memory (SDRAM).

Accesses to the SDRAM 40 from the ASIC 20 are performed by a specific SDRAM controller 50 connected to the bus 30 in the ASIC 20.

Again, the invention is not limited to such a structure. The SDRAM controller 50 may be integrated with the bus masters in a single device, or may be provided as a separate device.

The SDRAM controller 50 is connected to the SDRAM 40 by way of a memory bus 60, which in the illustrated embodiment of the invention is also an AHB bus.

Figure 2:
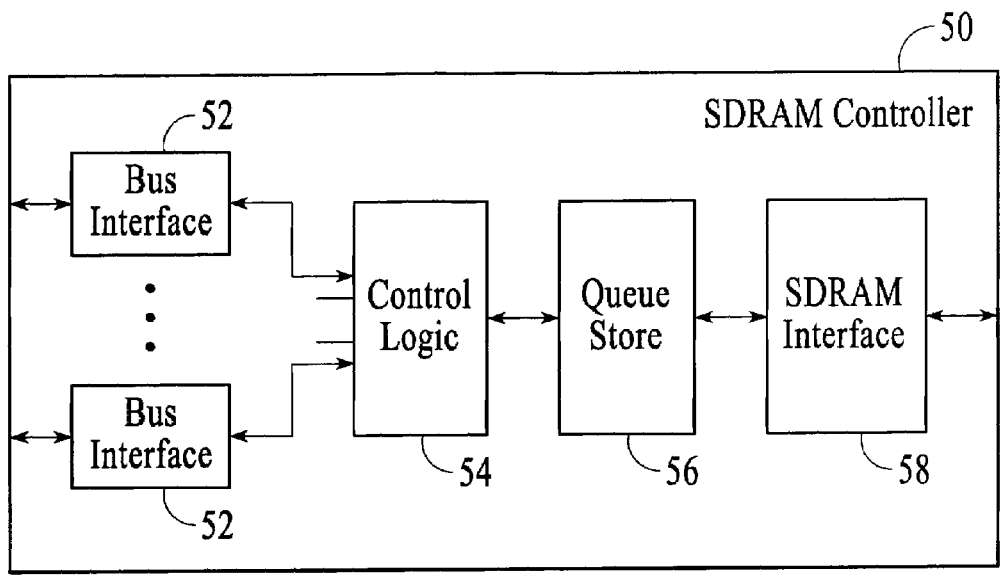
FIG. 2 is a block schematic diagram of a SDRAM controller in the computer system of FIG. 1.

FIG. 2 is a block schematic diagram, showing the form of the SDRAM controller 50.

The SDRAM controller 50 is shown in FIG. 2, and described herein, only to the extent required for an understanding of the present invention. Other features of the SDRAM controller, which are not required for that purpose, will not be described, and may be assumed to be generally conventional, as known to the person of ordinary skill in the art.

In the illustrated embodiment, the SDRAM controller 50 has multiple bus interface blocks 52, for connection to respective bus master devices. For example, in the system shown in FIG. 1, there may be one bus interface 52 allocated for connection to each of the modules 25 and the CPU 27. However, in other embodiments of the invention, there may be only one such bus interface block.

Memory access requests, received by the SDRAM controller 50 at the bus interface blocks 52, are passed to a control logic block 54, the operation of which is described more fully below.

After processing in the control logic block 54, the memory access requests are placed in a queue in a queue store block 56, which may for example take the form of a first-in, first-out memory. The memory access requests from the queue are then passed in turn to a SDRAM interface block 58.

Figure 3:
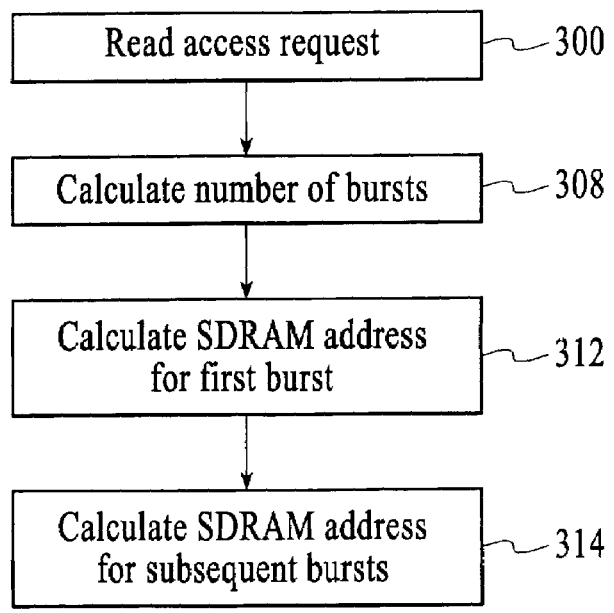
FIG. 3 is a flow chart illustrating a method in accordance with the present invention.

FIG. 3 is a flow chart, illustrating a method performed in the control logic block 54, according to an aspect of the present invention.

The process starts at step 300, when a read access request is received at a bus interface 52 from one of the master devices.

The read access request indicates the amount of required data with reference to the properties of the AHB bus 60, namely the burst length, which is a feature of the bus protocol, and the AHB word size, which can be less than or equal to the width of the bus. The read access request also indicates the burst type, i.e. whether a wrapping burst or an incrementing burst is required.

Also in step 300, the control logic 56 reads the starting address of the request, that is, the address within the SDRAM 40 from which data is first to be retrieved.

In step 308, the control logic 56 then calculates the number of SDRAM bursts required to fulfil the access request.

For example, if the AHB word size is 64 bits, and the AHB burst length is 16, while the SDRAM word size is 32 bits, and the SDRAM burst length is 8, then four SDRAM bursts are required to fulfil the access request if the starting address of the request corresponds with a SDRAM burst boundary, while four or five SDRAM bursts are required, depending on whether the burst type is wrapping or incrementing, if the starting address of the request does not correspond with a SDRAM burst boundary.

As another example, again taking the SDRAM word size to be 32 bits, and the SDRAM burst length to be 8, if the AHB word size is 32 bits, and the AHB burst length is 8, but the starting address of the request does not correspond with a SDRAM burst boundary, then two SDRAM bursts are required to fulfil the access request if the access request indicates that the required burst type is incrementing, as opposed to wrapping.

Next, the control logic 54 determines the starting SDRAM addresses of the required SDRAM bursts. Thus, in step 312, the control logic then translates the AHB address into a SDRAM address, within the SDRAM 40. In the case discussed above, where more than one SDRAM burst is required, the control logic calculates the SDRAM address for the first SDRAM burst. The SDRAM address is made up of a SDRAM chip select, a SDRAM row address and a SDRAM column address.

Thus, a set of SDRAM devices returning data for a particular request comprise a physical bank of memory. Multiple physical banks may be provided, in which case each physical bank is accessed using a different chip select. Within the physical bank, a specific memory location is defined by a row address and a column address. The calculated SDRAM address therefore uniquely identifies a memory location within the memory device.

In step 314, in the case where more than one SDRAM burst is required, the control logic 54 also determines SDRAM addresses for the remaining SDRAM bursts.

In each case, since the chip select and starting row address values remain the same throughout an AHB burst, the calculated starting SDRAM addresses for the second and subsequent SDRAM bursts need relate only to the column address values.

The separate read requests for each required SDRAM burst, including the respective starting addresses, are then placed into a queue of access requests in the queue store 56 of the SDRAM controller 50. The stored access requests are then handled in turn by the SDRAM interface 58.

As is known to the person skilled in the art, the control logic 56 may also, in addition to the processes described herein, apply a form of prioritisation to the access requests when placing them into the queue of access requests in the queue store 56. For example, access requests received on different bus interfaces 52 may be given different priorities.

In addition, or alternatively, access requests received on different bus interfaces 52 may be prioritised in a way which maximises the efficiency of use of the memory bus 60. For example, opening a page of the SDRAM to process an access request results in a delay in processing. Therefore, it is advantageous if access requests relating to the same page of the SDRAM can be queued consecutively.

In accordance with the invention, therefore, the SDRAM controller can ensure that, for an AHB burst corresponding to multiple SDRAM bursts, the access requests corresponding to the multiple SDRAM bursts are queued together, so that the read latency is incurred only once. When placing the multiple access requests in the queue store 56, a flag may be set on at least the first of said stored access requests. This allows the SDRAM controller 50 to perform back-to-back SDRAM read bursts, and therefore increases the effective rate at which data can be read from the SDRAM.

Further, when enough SDRAM read bursts have been performed to retrieve all of the data requested in the access request received on the bus interfaces 52, no additional data need be retrieved.

The invention has been described herein with reference to one particular embodiment. However, other embodiments of the invention are also possible. The scope of the present invention is therefore to be determined only by the accompanying claims.

The invention claimed is:

1. A memory controller, comprising:
   at least one bus interface, each bus interface being for connection to at least one respective devices for receiving memory access requests;
   a memory interface, for connection to a memory device; and
   control logic, for placing received memory access requests into a queue of memory access requests, wherein, when a queued memory access request is a read access request which requires multiple bursts of data to be read from the memory device, the control logic calculates the number of required data bursts and a starting address for each burst, and places the respective memory access requests into the queue of memory access requests such that back-to-back SDRAM read bursts can be subsequently performed, wherein the memory access requests that require multiple bursts are queued together so read latency is incurred only once.

2. A memory controller as claimed in claim 1, wherein, when a memory access request is a read access request which requires multiple bursts of data to be read from the memory device, the calculated starting address for a first of said required data bursts comprises a row address and a column address, and the calculated starting address for a second and any subsequent required data bursts comprises a column address but no row address.

3. A memory controller as claimed in claim 2, wherein the calculated starting address for the first of said required data bursts further comprises a chip select indication.

4. A memory controller as claimed in claim 1, comprising a plurality of bus interfaces, wherein memory access requests received from different bus interfaces may be placed into the queue of memory access requests with different priorities.

5. A memory controller as claimed in claim 1, comprising a plurality of bus interfaces, wherein memory access requests received from different bus interfaces may be placed into the queue of memory access requests with priorities determined in such a way as to maximize efficient usage of a memory bus connected to the memory interface.

6. A memory controller as claimed in claim 1, wherein the multiple bursts of data are provided within one successive clock cycle.

7. A memory controller as claimed in claim 1, wherein control logic determines if the read access requires a incrementing burst type of wrapping burst type.

8. In a memory controller, comprising at least one bus interface, each bus interface being for connection to at east one respective devices for receiving memory access requests; and a memory interface, for connection to a memory device; the method comprising:
- when a queued memory access request is a read access request which requires multiple bursts of data to be read from the memory device, calculating the number of required data bursts and a starting address for each burst, and
- placing the respective memory access requests into a queue of memory access requests such that back-to-back SDRAM read bursts can be subsequently performed, wherein the memory access requests are queued together so read latency is incurred only once.

9. A method as claimed in claim 8, comprising, when a memory access request is a read access request which requires multiple bursts of data to be read from the memory device, calculating said starting address for a first of said required data bursts comprising a row address and a column address, and calculating said starting address for a second and any subsequent required data bursts comprising a column address but no row address.

10. A method as claimed in claim 9, comprising calculating said starting address for the first of said required data bursts comprising a chip select indication.

11. A method as claimed in claim 8, in a memory controller comprising a plurality of bus interfaces, comprising placing memory access requests received from different bus interfaces into the queue of memory access requests with different priorities.

12. A method as claimed in claim 8, in a memory controller comprising a plurality of bus interfaces, comprising placing memory access requests received from different bus interfaces into the queue of memory access requests with priorities determined in such a way as to maximize efficient usage of a memory bus connected to the memory interface.

13. A method as claimed in claim 8, further comprising determining the burst length or the burst type of the memory access requests.

14. A memory controller, comprising:
- at least one first bus interface, for connection to a master device for receiving queued memory access requests and for transmitting data to the master device;
- a second bus interface, for connection to a memory device, such that data can be retrieved from the memory device in data bursts;
- control logic, for receiving memory access requests from the first bus interface, and for calculating a required number of data bursts needed to deal with each received memory access request; and
- a queue store, for storing addresses relating to each of the calculated number of data bursts subsequently performed,
- wherein the control logic stores data in the queue store, relating to each of the required number of data bursts, wherein memory access requests that require multiple bursts are queued together so read latency is incurred only once.

15. A memory controller as claimed in claim 14, wherein the control logic stores data in the queue store, relating to each of the required number of data bursts, such that the data bursts corresponding to a received memory access request can be retrieved without incurring a separate read latency for each data burst.

16. A memory controller as claimed in claim 14, wherein the control logic stores data in the queue store, indicating that the required number of data bursts correspond to a single received memory access request.

17. A memory controller as claimed in claim 14, wherein the control logic prioritizes the memory access requests based on bus interface type, or single burst, or multiple burst.

18. A memory controller as claimed in claim 14, wherein the control logic determines from the memory access requests a burst length or a burst type.

* * * * *